(12) United States Patent
Kelly et al.

(10) Patent No.: US 7,985,576 B2
(45) Date of Patent: Jul. 26, 2011

(54) METHODS AND SYSTEMS FOR BIOLOGICAL TREATMENT OF FLUE GAS DESULFURIZATION WASTEWATER

(75) Inventors: Robert F. Kelly, Chesterfield, VA (US); Michael Pudvay, Midlothian, VA (US); Antonio Lau, Richmond, VA (US)

(73) Assignee: Infilco Degremont, Inc., Richmond, VA (US)

( * ) Notice: Subject to any disclaimer, the term of this patent is extended or adjusted under 35 U.S.C. 154(b) by 1007 days.

(21) Appl. No.: 11/894,875

(22) Filed: Aug. 22, 2007

(65) Prior Publication Data

US 2008/0050801 A1 Feb. 28, 2008

Related U.S. Application Data

(60) Provisional application No. 60/840,084, filed on Aug. 25, 2006.

(51) Int. Cl.
*A61L 9/01* (2006.01)
*B01D 50/00* (2006.01)
*B01D 53/34* (2006.01)
*F01N 3/00* (2006.01)
*F23J 11/00* (2006.01)

(52) U.S. Cl. ......... 435/266; 422/168; 422/171; 422/172

(58) Field of Classification Search .................. 435/266; 422/168, 171, 172
See application file for complete search history.

(56) References Cited

U.S. PATENT DOCUMENTS

| 4,614,588 | A | * | 9/1986 | Li | 210/603 |
| 5,830,357 | A | * | 11/1998 | Vredenbregt et al. | 210/611 |
| 6,235,204 | B1 | * | 5/2001 | Castaldi et al. | 210/719 |
| 6,235,248 | B1 | * | 5/2001 | Buisman et al. | 422/171 |
| 2006/0029531 | A1 | * | 2/2006 | Breen et al. | 423/210 |

FOREIGN PATENT DOCUMENTS

| JP | 59-173199 | 10/1984 |
| JP | 09001180 | 1/1997 |
| JP | 2006-205097 | 8/2008 |
| WO | 2007-012181 | 2/2007 |

* cited by examiner

*Primary Examiner* — Michael A Marcheschi
*Assistant Examiner* — Lydia Edwards
(74) *Attorney, Agent, or Firm* — DLA Piper LLP (US)

(57) ABSTRACT

Systems and methods of treating flue gas and wastewater generated by treating the flue gas are disclosed and include introducing the flue gas, a flue gas treatment fluid that removes sulfur dioxide from the flue gas; and an organic acid conditioning agent into a wet-oxidation scrubber/absorber; introducing FGD scrubber wastewater generated by the wet-oxidation scrubber/absorber into an anoxic biological reactor to substantially denitrify the FGD scrubber wastewater; and introducing resulting substantially denitrified FGD scrubber wastewater into an anaerobic biological reactor to substantially reduce the amount of sulfate and/or selected heavy metals in the FGD scrubber wastewater.

29 Claims, 2 Drawing Sheets

METHODS AND SYSTEMS FOR BIOLOGICAL TREATMENT OF FLUE GAS DESULFURIZATION WASTEWATER

CROSS-REFERENCE TO RELATED APPLICATION

This application is based upon and claims the benefit of priority from U.S. Provisional Application Ser. No. 60/840,084 filed Aug. 25, 2006, the entire contents of which are incorporated by reference herein.

TECHNICAL FIELD

This disclosure relates to wastewater treatment methods and systems that remove organic and inorganic pollutants captured in the purge stream from air pollution control equipment.

BACKGROUND

Coal-fired power plants continue to produce a significant proportion of the electricity requirements for the United States. The combustion and gasification of coal is widely recognized as a significant environmental issue due to the potential release of hazardous pollutants. As a consequence, air quality standards continue to tighten. This results in the implementation of scrubbers for emissions control, most notably sulfur dioxide ($SO_2$), from coal-fired power plants.

Wet scrubber technology with lime slurry/limestone is a proven and commercially established process for flue gas emissions control, particularly $SO_2$ removal, from coal-fired power plants.

Wet scrubbers are usually designed with 80 to 95% efficiency of $SO_2$ removal. However, facilities often use additives such as magnesium-enhanced lime or organic acids to improve process efficiency by 5 to 10%. This is particularly true in light of the market value of so-called $SO_2$ "removal credits" and the potential for significant economic gain. However, the use of additives at the absorber may cause difficulties with the implementation and performance of downstream biological treatment systems.

For example, Flue Gas Desulfurization (FGD) process wastewater contains elevated levels of chlorides; significant concentrations of heavy metal contaminants such as chromium, mercury, and selenium; often high levels of nitrates; and a very high solids content that consists primarily of calcium sulfate, calcium carbonate, magnesium hydroxide, and fly ash.

Treatment of FGD wastewater is a significant need for utility operations. Physical/chemical treatment processes are typically used for neutralization and calcium sulfate desaturation, removal of some heavy metals, clarification and sludge thickening. However, conventional chemical precipitation techniques do not reliably eliminate heavy metal contaminants such as selenium and hexavalent chromium below outfall discharge limits established by newer, more stringent regulatory requirements. Nor do these current practices remove nitrogenous pollution.

FGD process wastewater is the focus of increasingly stringent effluent requirements, with outfall discharge standards (monthly average and daily maximum) typically established for:
  pH
  Total Suspended Solids (TSS)
  Total Nitrogen (TN)
  Heavy Metals including but not limited to Arsenic, Chromium, Copper, Mercury & Selenium
  Sulfides.

Selenium is an essential micronutrient for animals and bacteria. However, it becomes highly toxic when present above minute concentrations. The oxidized species of selenium, selenate (Se VI) and selenite (Se IV), are highly soluble and bioavailable, whereas reduced forms are insoluble and much less bioavailable. Regulatory limits for soluble selenium remain variable with targets ranging from 800 ug/L down to the U.S. national drinking water standard of 50 ug/L, frequently depending upon the discharge receiving water body.

Selenium exists in multiple valence states in the natural environment and the impact of selenium speciation on treatment efficiency is known. Notably, Selenium in the form of Selenite (Se IV; $SeO_3$) can be removed with 65 to 85% efficiency using physical-chemical treatment approaches while Selenate (Se VI; $SeO_4$) removal efficiency is limited to <10% with physical-chemical treatment.

It would therefore be helpful to provide an enhanced biological treatment approach to circumvent such problems, optimizing downstream removal of TN and heavy metals from FGD wastewater while maintaining $SO_2$ removal efficiency at the absorber stage.

SUMMARY

A method of treating flue gas and wastewater generated by treating the flue gas is disclosed and includes:
  introducing the flue gas and an organic acid conditioning agent into a wet-oxidation scrubber/absorber substantially to remove sulfur dioxide from the flue gas and condition resulting FGD wastewater for downstream biological treatment;
  introducing FGD scrubber wastewater generated by the absorber into an anoxic biological reactor to substantially denitrify and/or reduce selected heavy metals in the FGD scrubber wastewater; and
  introducing substantially denitrified wastewater into an anaerobic biological reactor to substantially reduce the amount of sulfate and/or selected heavy metals in the FGD scrubber wastewater.

A system for treating flue gas and wastewater generated by treating the flue gas is disclosed and includes:
  a wet-oxidation scrubber/absorber comprising a flue gas inlet, a flue gas treatment fluid inlet, an organic acid conditioning agent inlet, and a wastewater outlet;
  an anoxic reactor located downstream of the wet-oxidation scrubber/absorber to substantially denitrify FGD scrubber wastewater generated by the absorber; and
  an anaerobic reactor located downstream of the anoxic reactor to substantially reduce the amount of sulfate and/or selected heavy metals in the FGD scrubber wastewater.

A method of treating FGD scrubber wastewater includes:
  introducing FGD scrubber wastewater generated by combining flue gas and an organic acid conditioning agent in a wet-oxidation scrubber/absorber into an anoxic reactor to substantially denitrify the FGD scrubber wastewater; and
  introducing substantially denitrified wastewater into an anaerobic reactor to reduce the amount of sulfate and/or selected heavy metals in the FGD scrubber wastewater.

A system for treating FGD scrubber wastewater includes:

an anoxic biological reactor located downstream of a wet-oxidation scrubber/absorber to substantially denitrify FGD scrubber wastewater generated by the absorber; and an anaerobic biological reactor located downstream of the anoxic reactor to substantially reduce the amount of sulfate and/or selected heavy metals in the FGD scrubber wastewater.

DETAILED DESCRIPTION

Figure 1:
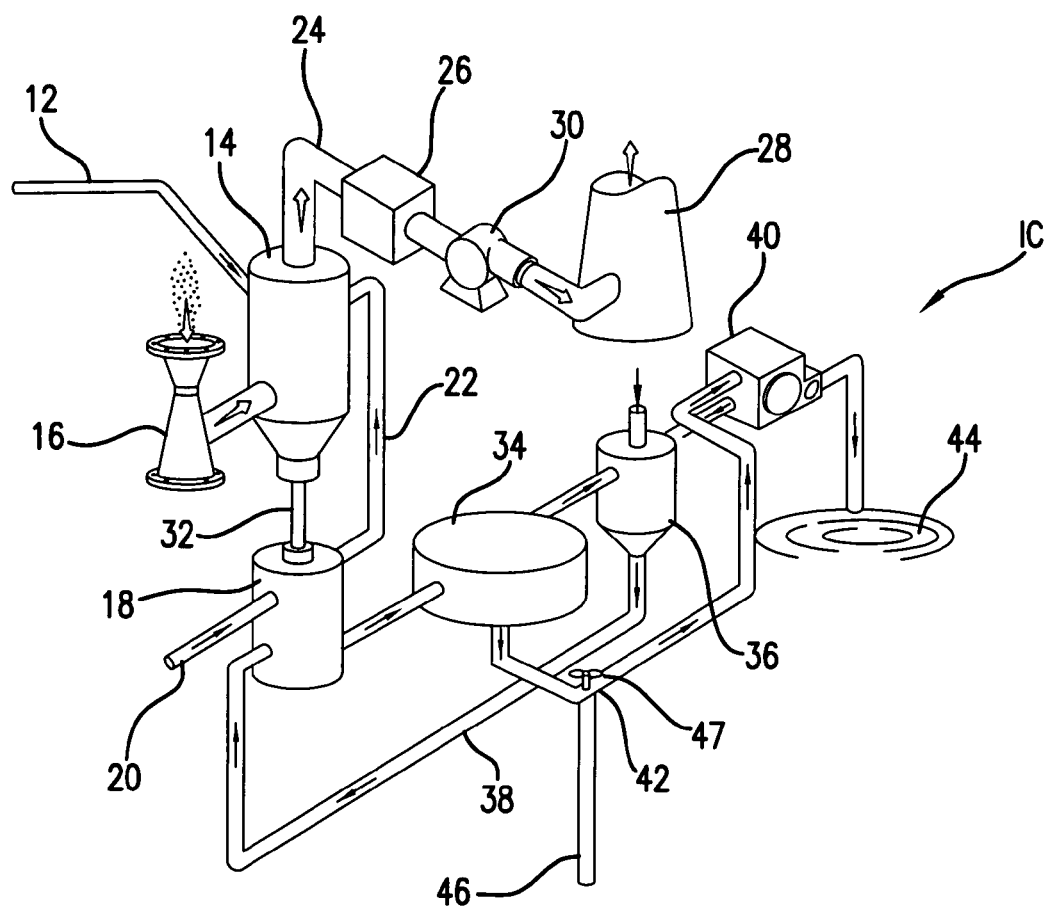
FIG. 1 is a schematic diagram of a representative process flow for a wet-oxidation scrubber/absorber system and associated conventional FGD wastewater treatment system.

It will be appreciated that the following description is intended to refer to specific aspects of this disclosure selected for illustration in the drawings and is not intended to define or limit the disclosure, other than in the appended claims.

This disclosure relates to biological treatment systems for FGD scrubber wastewater, encompassing the feed of a pure organic acid conditioning reagent, such as formic acid, to the wet-oxidation scrubber/absorber and later followed by a combination of anoxic, anaerobic and aerobic staged activated sludge reactors and associated clarification systems for removal of TN, reduction and precipitation of heavy metals and elimination of suspended solids from the FGD purge stream.

This disclosure also relates to processes for biological treatment of FGD scrubber wastewater, particularly to treatments that improve the removal efficiency of TN and heavy metals including but not limited to selenium.

Turning now to the drawings in general and FIG. 1 in particular, it will be appreciated that a selected, representative pollution control system 10 described below removes FGD wastewater contaminants. The treatment system 10 includes a line 12 to add a pure organic acid conditioning reagent, such as formic acid, to absorber 14 as indicated in FIG. 1.

The absorber 14 also connects to a particle scrubber 16 and a recirculation tank 18. The recirculation tank 18 directly receives flue gas treatment fluid through supply line 20 which is indirectly supplied into absorber 14 by way of line 22. Flue gas treatment fluid may comprise, among other things, a lime/limestone water slurry. Treated flue gases exit absorber 14 through line 24, are reheated by reheater 26 and then moved to stack 28 by fan 30.

On the other end, FGD scrubber wastewater exits absorber 14 through line 32 and enters recirculation tank 18. Selected portions of FGD scrubber wastewater exit through recirculation tank 18 and may proceed to clarifier 34. This may be followed by passage of the clarified wastewater to holding tank 36. Wastewater contained in holding tank 36 can be recycled to recirculation tank 18 by way of line 38. The partially dewatered sludge may be channeled from clarifier 34 to vacuum filter 40 by way of line 42, where most of the remaining water is removed. The waste sludge can then be sent to a settling pond or landfill 44.

Figure 2:
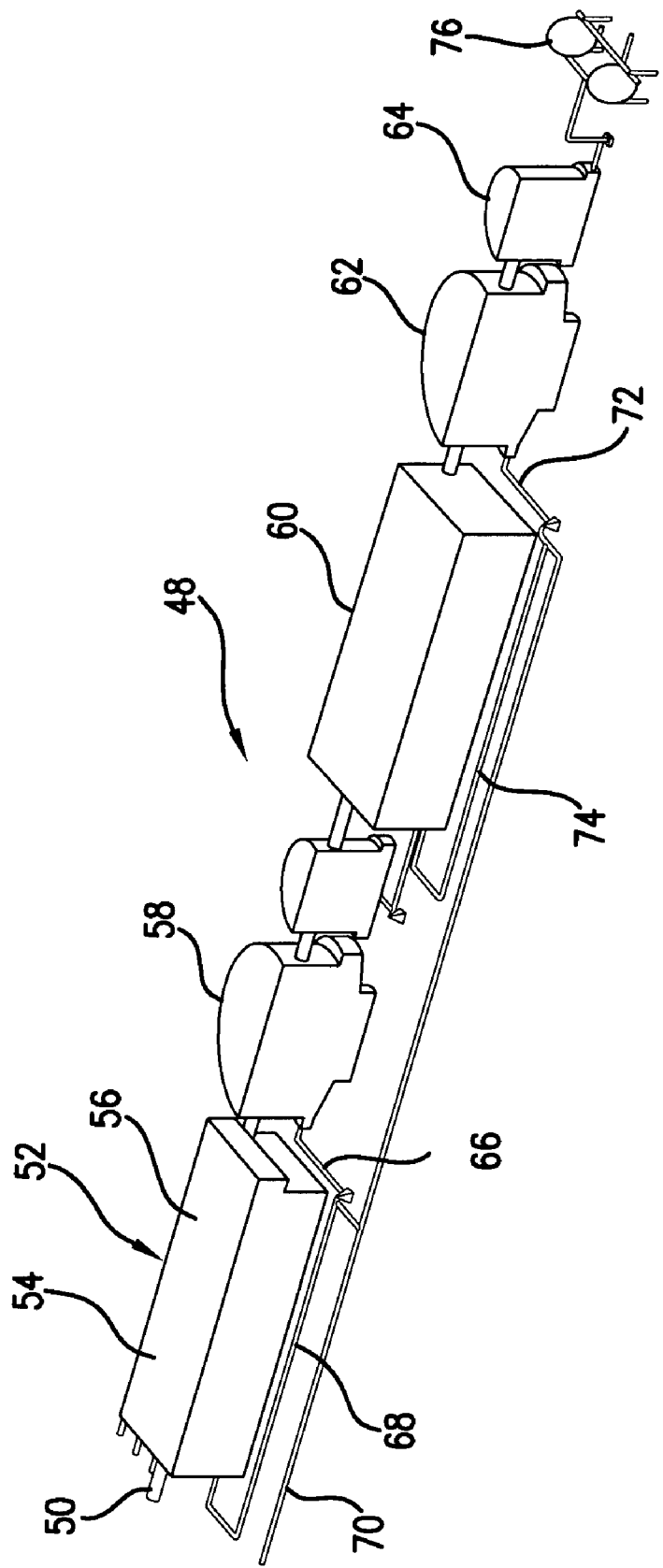
FIG. 2 is a schematic flow diagram of a representative biological treatment system for FGD scrubber wastewater.

In accordance with selected aspects of this disclosure, FGD scrubber wastewater may also flow from clarifier 34 to additional treatment systems such as a biological treatment system of FIG. 2 by way of line 46 and as activated by valve 47.

Turning now to FIG. 2, a selected, representative biological treatment system 48 for FGD scrubber wastewater is shown in a schematic form. The system 48 includes an inlet 50, a staged suspended growth biological reactor 52 comprising anoxic 54 and anaerobic 56 zones, an intermediate clarifier 58, an aerobic suspended growth biological reactor 60, a final clarifier 62, a storage tank 64 and a filtration stage 76.

The biological treatment system 48 of FIG. 2 can perform the following functions:

Anoxic Stage—Denitrification (Nitrate reduction) and/or reduce selected heavy metals Anaerobic Stage—Selected heavy metal reduction and precipitation, particularly Selenium reduction Aerobic Stage—Nitrification (ammonia reduction) and organics reduction.

The biological treatment system 48 may receive influent feed from an upstream physical-chemical treatment system such as from clarifier 34, for example, of FIG. 1, in the form of deoxygenated FGD purge wastewater. The biological reactors of the system 48 may include completely mixed, continuous flow, activated sludge reactors.

The first cell (or reactor 54) in the system 48 is the anoxic stage, where nitrates are reduced to nitrogen gas via denitrification reactions. As FGD wastewater is deficient in macronutrients, including ammonia nitrogen and orthophosphorous, as well as many of the micronutrients required to support biological growth, there is a process requirement for supplemental nutrient addition to yield efficient treatment performance. Reactor 54 is thus fed with a biodegradable nutrient blend, containing macro- and micronutrients to maintain microbial growth.

Nutrients include but are not limited to supplemental carbon such as waste sugar, corn syrup, molasses or the like, urea or the like to provide ammonia nitrogen, phosphoric acid, micronutrients and yeast extract to provide necessary trace metals and growth factors. Fermentation of sugars dosed into the anoxic reactor 54 results in the conversion of sucrose to volatile fatty acids (VFAs) that sulfate/selenium reducing microorganisms are capable of metabolizing efficiently in the downstream anaerobic reactor stage(s). Additional carbon sources such as lactate, acetate or the like may also be added directly to the anoxic/anaerobic reactors to enhance selenium removal by enriching the selenium reducing microorganisms.

Further, addition of a pure organic acid stream, such as formic acid, through line 12 of absorber 14 provides a means to introduce a biodegradeable carbon substrate to the wastewater that can provide COD to the system for downstream biological removal of nitrates and selected heavy metals. For example, using the COD factor for formic acid of 0.35, a dosage of 200 mg/L formate equates to a theoretical COD dosage of about 70 mg/L.

The anoxic/anaerobic biological reactor 52 may be an overflow, under-flow weir design which mimics a plug-flow system without the need to incorporate separate reactor tanks that are physically isolated from one another. Other configurations/structures may be used as appropriate. Operational inputs for successful treatment involve targeting the appropriate oxidation-reduction potential (ORP) in the various reactor stages. Thus, the anoxic reactor 54 may preferably be maintained in the range of about −50 to about −300 mV to yield efficient denitrification.

The role of the anoxic denitrification reactor 54 is important. We found that efficient removal of selected heavy metals such as selenium substantially depends upon sequential substrate removal, specifically the prior elimination of nitrates.

Additionally, the efficiency of selenium removal is dependent upon the species present in the wastewater matrix. It is known that selenite (Se IV) is somewhat efficiently removed via physical chemical means while selenate (Se VI) requires biological treatment to obtain significant reductions. Surprisingly, we found that efficient biological removal also depends on the nature of complexes, such as organo-selenium compounds, formed within the wastewater matrix and addition of reagent additives to the scrubber/absorber heavily impacted the contaminants formed. We found that many organic complexes of selenium formed as a result of the use of organic acid containing manufacturing waste by-product mixtures at the absorber. These organo-selenium complexes were found to be surprisingly recalcitrant to selenium reduction by the microbial population in downstream biological reactors. We discovered that use of a pure organic acid reagent, such as formic acid, to improve $SO_2$ removal efficiency at the scrubber further provides downstream advantages by yielding a wastewater matrix that could readily be treated for selenium removal. The staged biological reactors create a reducing environment for the conversion of selenate or selenite to elemental selenium, which precipitates out of solution into the wastewater solids.

The partially treated FGD wastewater leaves the anoxic reactor 54 substantially devoid of nitrate contamination and flows into the next cell (i.e., the anaerobic reactor 56), which in one aspect may be operated at an ORP in the range of about −200 to about −500 mV, where sulfate and heavy metal-reducing organisms begin to remove sulfates and the selected heavy metals from the wastewater. The treated water then flows to an optional third cell (anaerobic reactor stage) to ensure that heavy metals are removed to levels allowing outfall discharge permits to be met.

The treated effluent from the anoxic/anaerobic biological reactors 54/56 may flow into a mix chamber allowing for chemical addition to improve downstream sedimentation within the intermediate clarifier 58. From the mix chamber of the anoxic/anaerobic reactors 54/56, the treated effluent flows into a settling type intermediate clarifier 58, where TSS is settled out and the clarifier underflow solids are recycled to the anoxic reactor 54 by lines 66 and 68 as return activated sludge (RAS) or sent to a sludge holding tank (not shown) by line 70 as waste activated sludge (WAS).

From the intermediate clarifier 58, the partially treated FGD wastewater flows into the aerobic biological reactor 60 for removal of BOD and ammonia. In one aspect, the aerobic biological reactor 60 includes operation at positive ORP.

From the aerobic reactor 60, the FGD wastewater flows into a settling type final clarifier 62, where TSS is settled out and clarifier underflow solids may be recycled to the head of the aerobic reactor 62 by lines 72 and 74 as return activated sludge (RAS) or sent to a sludge holding tank (not shown) by line 70 as waste activated sludge (WAS).

Finally, the clarified water flows into a wet effluent well/tank 64 for pumping to pressure filters 76 and ultimately discharge to the environment. The filters may be gravity sand, multimedia or the like type filters.

Powdered Activated Carbon (PAC) or other adsorbent materials such as charred poultry waste or the like added to the anaerobic and/or aerobic biological reactor will also adsorb any remaining organo-selenium complexes to assist reaching a final effluent selenium concentration that is below about 200 μg/L. PAC can be added at a dosage of about 550 ppm, for example.

EXAMPLE

A biological treatment system comprising of a 2-stage, completely mixed, anaerobic activated sludge reactor having a total reactor volume of approximately 2,000 gallons followed by a 500-gallon clarifier and an aerobic activated sludge reactor and final clarifier was fabricated and installed on a sidestream of FGD scrubber blowdown at an operating power generating station.

The facility initiated pure organic acid addition in the form of formic acid to the absorber to enhance the downstream biological treatment process while continuing to provide $SO_2$ removal at the wet-oxidation scrubber/absorber. Analysis revealed that the soluble oxyanions of Selenium, SeIV and Se VI, represented a significantly greater fraction of the total Selenium present in the sample matrix upon initiation of the pure organic acid feed to the wet-oxidation scrubber/absorber when compared to results obtained with the feed of an organic acid containing manufacturing by-product mixture. The use of a pure organic acid feed resulted in significant reductions in the levels of complexed selenium present. Subsequently, this resulted in improved treatability of the FGD wastewater with the performance of the biological treatment system greatly enhanced as noted below.

The staged activated sludge design was found to yield substantially complete denitrification of influent FGD scrubber wastewater under anoxic conditions, consistently achieving effluent $NO_3$—N concentrations below 1 mg/L for influent nitrate levels ranging from 200 to 600 mg/L.

Concurrent removal of sulfate and selenium was demonstrated under anaerobic conditions, with effluent soluble selenium concentrations consistently below 200 μg/L. Furthermore, the reduced environmental conditions required for both sulfate and oxidized selenium reduction was also found to provide the reducing conditions necessary for reduction and precipitation of additional heavy metal species including mercury and hexavalent chromium.

Surprisingly, the performance of the aerobic reactor, intended to perform polishing treatment for removal of excess CBOD and ammonia nitrogen was found to exhibit significant additional removal of soluble selenium species.

Furthermore, the aerobic reactor performance was found to be much less sensitive to changes in the influent soluble selenium concentration allowing for quick adaptation to system upsets that result in rapid increase in influent Se levels.

The benefits brought about by the methods and systems described above may include:

The complexity of Selenium speciation within FGD scrubber wastewaters may be reduced or eliminated by feeding a pure organic acid conditioning additive, such as formic acid, to the wet-oxidation scrubber/absorber. Subsequently, this approach improves downstream biological treatment while maintaining $SO_2$ removal efficiency at the absorber.

Use of a staged biological reactor approach to support the growth of distinct groups of bacteria within the naturally occurring population.

Use of conventional suspended growth activated sludge technology eliminates need to backwash or flush reactors periodically to remove captured waste material.

Reactors are seeded with biomass from natural microbial populations avoiding the need to regularly add "specialized" microbial cultures and thereby reducing annual operational costs.

Treatment approach provides operational flexibility and stable operations/performance under highly variable influent conditions.

Biological removal of selenocyanate forms and other complexed selenium species that are much harder to remove with conventional iron-coprecipitation treatment strategies.

Biological removal of heavy metals, including selenium, in absence of reducing agent feed, such as potassium permanganate, to the biological reactors.

Thus, the use of suspended growth biological treatment methods and systems for the removal of TN and heavy metal contaminants from FGD wastewater offers several potential advantages when compared to conventional chemical precipitation techniques including the use of biodegradable nutrients as opposed to iron-based reagents, elimination of nitrogen-containing pollution, elimination of difficult to remove heavy metal contaminants such as selenate to extremely low levels, production of less sludge and reduced operational expenses.

Although the above methods and systems have been described generally in accordance with the figures, it should be understood that the above descriptions and figures are merely representative, selected examples. Variations and/or substitutions may be made as appropriate by those skilled in the art. For example, although we have shown selected biological reactors in various shapes and configurations and made from selected materials, it should be understood that such shapes, configurations and materials can be changed as appropriate in accordance with the surrounding environment makes practicable. Also, biological reactors may contain support media to provide a means of attached biological growth in addition to the suspended growth fraction. Of course, other components and steps known in the art may be added to meet various conditions at particular sites.

What is claimed is:

1. A method of treating flue gas and wastewater generated by treating the flue gas comprising:
   introducing the flue gas and an organic acid conditioning agent into a wet-oxidation scrubber/absorber;
   introducing FGD scrubber wastewater generated by the wet-oxidation scrubber/absorber into an anoxic biological reactor to substantially denitrify and/or reduce selected heavy metals in the FGD scrubber wastewater; and
   introducing resulting substantially denitrified FGD scrubber wastewater into an anaerobic biological reactor to substantially reduce the amount of sulfate and/or selected heavy metals in the FGD scrubber wastewater;
   wherein the anaerobic reactor contains selected heavy metal reducing organisms to reduce oxidized species of corresponding heavy metals contained in the FGD scrubber wastewater into insoluble form.

2. The method of claim 1, wherein the oxidized species are at least selenate (Se VI) and selenite (Se IV).

3. A method of treating flue gas and wastewater generated by treating the flue gas comprising:
   introducing the flue gas and an organic acid conditioning agent into a wet-oxidation scrubber/absorber;
   introducing FGD scrubber wastewater generated by the wet-oxidation scrubber/absorber into an anoxic biological reactor to substantially denitrify and/or reduce selected heavy metals in the FGD scrubber wastewater; and
   introducing resulting substantially denitrified FGD scrubber wastewater into an anaerobic biological reactor to substantially reduce the amount of sulfate and/or selected heavy metals in the FGD scrubber wastewater;
   wherein the organic acid conditioning agent is at least one selected from the group consisting of acetic acid, adipic acid, formic acid and dibasic acid.

4. The method of claim 1, wherein the anaerobic reactor contains sulfate reducing organisms to reduce sulfate contained in the FGD scrubber wastewater.

5. The method of claim 1, further comprising introducing the FGD scrubber wastewater into an aerobic biological reactor to reduce the amount of CBOD and/or ammonia contained in the FGD scrubber wastewater.

6. The method of claim 1, further comprising maintaining the anoxic biological reactor in the range of about −50 to about −300 mV.

7. The method of claim 1, further comprising maintaining the anaerobic biological reactor in the range of about −200 to about −500 mV.

8. The method of claim 1, which produces less than about 200 μg/L soluble selenium concentration in the treated FGD scrubber wastewater.

9. The method of claim 1, further comprising introducing a supplemental carbon source and/or other nutrients into the anaerobic biological reactor.

10. The method of claim 1, wherein the selected heavy metals are at least one selected from the group consisting of Hg, V, Tl, Cr and Se and compounds thereof.

11. The method of claim 1, further comprising introducing FGD scrubber wastewater from the anaerobic biological reactor into an intermediate clarifier and/or media filter.

12. The method of claim 5, further comprising introducing FGD scrubber wastewater from the aerobic biological reactor into a final clarifier and/or media filter.

13. The method of claim 12, further comprising recycling at least a portion of FGD scrubber wastewater from the final clarifier into the anaerobic biological reactor.

14. The method of claim 1, further comprising introducing a sugar into the FGD scrubber wastewater upstream of the anaerobic biological reactor.

15. The method of claim 1, wherein at least a portion of the flue gas treatment fluid is a lime/limestone water slurry.

16. The method of claim 1, further comprising introducing an adsorbent to the FGD scrubber wastewater to adsorb organo-heavy metal complexes.

17. A system for treating flue gas and wastewater generated by treating the flue gas comprising:
   a wet-oxidation scrubber/absorber comprising a flue gas inlet, a flue gas treatment fluid inlet, an organic acid conditioning agent inlet, and a FGD scrubber wastewater outlet;
   an anoxic reactor located downstream of the wet-oxidation scrubber/absorber to substantially denitrify FGD scrubber wastewater generated by the absorber;
   an anaerobic reactor located downstream of the anoxic reactor to substantially reduce the amount of sulfate and/or selected heavy metals in the wastewater;
   an aerobic biological reactor located downstream of the anaerobic reactor to reduce CBOD and/or ammonia in the wastewater; and
   an intermediate clarifier located between the anaerobic reactor and the aerobic reactor.

18. The system of claim 17, further comprising a recycling line to recycle at least a portion of effluent from the intermediate clarifier into the anoxic and/or the anaerobic reactor.

19. The system of claim 17, further comprising a final clarifier located downstream of the aerobic reactor.

20. The system of claim 17, wherein the organic acid conditioning agent inlet receives organic acid conditioning agent that is at least one selected from the group consisting of acetic acid, adipic acid, formic acid and dibasic acid.

21. The system of claim 17, further comprising maintaining the anoxic biological reactor in the range of about −50 to about −300 mV.

22. The system of claim 17, further comprising maintaining the anaerobic biological reactor in the range of about −200 to about −500 mV.

23. The system of claim 17, which produces less than about 200 µg/L soluble selenium concentration in the treated FGD scrubber wastewater.

24. The system of claim 17, further comprising introducing a supplemental carbon source into the anaerobic biological reactor.

25. The system of claim 17, wherein the selected heavy metals are at least one selected from the group consisting of Hg, Cr and Se and compounds thereof.

26. The system of claim 17, wherein a sugar is introduced into the FGD scrubber wastewater upstream of the anaerobic biological reactor.

27. The system of claim 17, wherein at least a portion of the flue gas treatment fluid is a lime/limestone water slurry.

28. The system of claim 17, wherein an adsorbent is introduced into the FGD scrubber wastewater to adsorb organo-heavy metal complexes.

29. The system of claim 19, further comprising a recycling line to recycle at least a portion of effluent from the final clarifier into the aerobic reactor.

* * * * *